United States Patent [19]

Buljan et al.

[11] 4,425,141
[45] Jan. 10, 1984

[54] COMPOSITE CERAMIC CUTTING TOOL

[75] Inventors: Sergej-Tomislav Buljan, Acton; Vinod K. Sarin, Lexington, both of Mass.

[73] Assignee: GTE Laboratories Incorporated, Waltham, Mass.

[21] Appl. No.: 380,364

[22] Filed: May 20, 1982

[51] Int. Cl.$^3$ .................................... C04B 31/16
[52] U.S. Cl. .................................... 51/309; 51/295; 51/308
[58] Field of Search .................. 51/295, 308, 309

[56] References Cited

U.S. PATENT DOCUMENTS

| | | | |
|---|---|---|---|
| 3,291,623 | 12/1966 | Saunders et al. | 501/92 |
| 3,305,372 | 2/1967 | Taylor | 501/92 |
| 3,580,708 | 5/1971 | Ogawa et al. | 51/309 |
| 3,890,250 | 6/1975 | Rickerson | 252/516 |
| 4,113,503 | 9/1978 | Lumby et al. | 106/73.4 |
| 4,234,343 | 11/1980 | Anderson | 106/73.2 |
| 4,243,621 | 1/1981 | Mori et al. | 264/65 |
| 4,252,768 | 2/1981 | Perkins et al. | 264/332 |
| 4,341,874 | 7/1982 | Nishida et al. | 501/97 |

FOREIGN PATENT DOCUMENTS 537986 8/1975 U.S.S.R.

OTHER PUBLICATIONS

Mah et al., "Fracture Toughness and Strength of $Si_3N$-4-TiC Composites," Ceramic Bullentin, vol. 60, #11, (1981), pp. 1229-1240.

Gnesin et al., "Optimization of the Properties of a Tool Material Based on $Si_3N_4$," Soviet Powder Metallurgy and Metal Ceramics, vol. 17, #1 (181).

Shimado et al., "High Pressure Sintering of Non-Oxide Materials," NASA Technical Memorandum 75744, (Nov. 1979).

Hatschek, "Take a New Look at Cermics/Cermets," American Machinist, May 1981, pp. 165-176.

*Primary Examiner*—Donald E. Czaja
*Assistant Examiner*—W. Thompson
*Attorney, Agent, or Firm*—Jerry F. Janssen; Ivan L. Ericson

[57] ABSTRACT

Abrasion resistant composite cutting tools comprise a particulate material selected from the group consisting of the refractory metal carbides, nitrides, carbonitrides and combinations thereof uniformly distributed in a matrix. The particulate material is of an average particle size ranging between about 0.5 microns to about 20 microns and comprises from about 5 to about 60 volume percent of the composite cutting tool. The matrix consists essentially of a modified silicon aluminum oxynitride having about 2 to about 25 volume percent of a modifier selected from the oxides of silicon, yttrium, magnesium, hafnium, zirconium, beryllium, the lanthanides and combinations thereof.

9 Claims, 5 Drawing Figures

COMPOSITE CERAMIC CUTTING TOOL

CROSS-REFERENCE TO RELATED APPLICATIONS

This application contains subject matter related to matter disclosed and claimed in copending patent application, Ser. No. 128,070 filed Mar. 7, 1980 entitled "Abrasion Resistant Silicon Nitride Based Articles" and in the following copending applications filed concurrently herewith, all assigned to the assignee of the present application:

Application Ser. No. 380,361 entitled "Process for Making a Modified Silicon Aluminum Oxynitride Based Composite Cutting Tool";
Application Ser. No. 380,384, entitled "Carbide Coated Silicon Nitride Cutting Tools";
Application Ser. No. 380,363, entitled "Alumina Coated Silicon Nitride Cutting Tools";
Application Ser. No. 380,381, entitled "Carbonitride Coated Silicon Nitride Cutting Tools";
Application Ser. No. 380,383, entitled "Nitride Coated Silicon Nitride Cutting Tools";
Application Ser. No. 380,362, entitled "Carbide Coated Composite Silicon Nitride Cutting Tools";
Application Ser. No. 380,379, entitled "Alumina Coated Composite Silicon Nitride Cutting Tools";
Application Ser. No. 380,382, entitled "Carbonitride Coated Composite Silicon Nitride Cutting Tools";
Application Ser. No. 380,380, entitled "Nitride Coated Composite Silicon Nitride Cutting Tools";
Application Ser. No. 380,387, entitled "Carbide Coated Composite Modified Silicon Aluminum Oxynitride Cutting Tools";
Application Ser. No. 380,388, entitled "Alumina Coated Composite Modified Silicon Aluminum Oxynitride Cutting Tools";
Application Ser. No. 380,389, entitled "Carbonitride Coated Composite Modified Silicon Aluminum Oxynitride Cutting Tools";
Application Ser. No. 380,452, entitled "Nitride Coated Composite Modified Silicon Aluminum Oxynitride Cutting Tools".

FIELD OF THE INVENTION

This invention relates to composite ceramic cutting tools and cutting tool inserts. More particularly, it is concerned with a cutting tool fabricated of a modified silicon aluminum oxynitride containing one or more hard refractory materials.

BACKGROUND OF THE INVENTION

U.S. Pat. No. 4,252,768 to Perkins, et al. discloses abrasion resistant nozzles fabricated by distributing hard refractory metal carbides in a binary solid solution of a ceramic oxide and silicon nitride, preferably a ternary solid solution of a ceramic oxide, silicon nitride and aluminum nitride.

U.S.S.R. Pat. No. 537,986 to Gnesin discloses a ceramic material containing silicon nitride, metal carbide, and magnesium oxide or aluminum oxide, being exceptional in a way that, in order to increase the hardness and wear resistance, it contains as a form of metal carbide, titanium carbide.

In general, wear resistance of a tool depends upon both its resistance to abrasion wear (defined to a great extent by hardness and fracture toughness) and its resistance to chemical or diffusional wear. The wear mode of the tool depends upon the nature of the workpiece. In machining short-chipping materials such as gray cast iron, for example, tool wear is controlled predominanlty by abrasion wear resistance, while in the machining of long-chipping materials such as steel, resistance to chemical wear becomes more important.

A wide variety of silicon nitride based materials containing aluminum oxide and other additional oxides constitute a group of modified silicon aluminum oxynitrides. These materials have relatively low hardness which limits their usefulness as cutting tool materials.

OBJECTS OF THE INVENTION

Accordingly, it is an object of the present invention to provide an improved abrasion resistant composite cutting tool.

It is another object of this invention to provide an improved abrasion resistant composite cutting tool with improved performance in cutting long-chipping workpiece materials.

SUMMARY OF THE INVENTION

These and other objects, advantages, and capabilities are provided in accordance with one aspect of the present invention wherein there is provided an improved abrasion resistant composite cutting tool consisting essentially of a particulate material selected from the refractory metal carbides, nitrides, carbonitrides and mixtures thereof uniformly distributed in a matrix. The matrix comprises a modified silicon aluminum oxynitride. The particulate material comprises from about 5 to about 60 volume percent of the cutting tool and has an average particle size of between about 0.5 microns to about 20 microns. The modified silicon aluminum oxynitride has a modifier selected from the group consisting of the oxides of silicon, yttrium, magnesium, hafnium, zirconium, beryllium, the lanthanides, and combinations thereof.

For a better understanding of the present invention together with other and further objects, advantages and capabilities thereof, reference is made to the following disclsoure and appended claims in connection with the above-described figures.

DETAILED DESCRIPTION

The polycrystalline bodies described herein have a composite microstructure of a modified silicon aluminum oxynitride, and a dispersed phase of refractory metal carbide, and/or niride, and/or carbonitride and/or solid solution thereof.

The modified silicon aluminum oxynitride is formed from of about 2 to about 25 volume percent of a modifier, from about 20 to about 90 volume silicon nitride, and from about 5 to about 60 volume percent aluminum oxide.

Many combinations of compounds can be used to obtain the modified silicon aluminum oxynitride described. For example, silicon nitride (containing up to about 5 volume percent silicon dioxide) and alumina may be employed. In that case, the alumina content is in the range from about 5 to about 60 volume percent, preferably from about 10 to about 30 volume percent. The sintering additive or modifier is selected from the group consisting of the oxides of silicon, yttrium, hafnium, zirconium, beryllium, the lanthanides, and combinations thereof. The preferred metal oxide modifier is yttrium oxide. Silicon dioxide is a glass-forming modifier which can be present in the silicon nitride starting powder or it may be purposely introduced. Unintentional impurities present in the body tend to concentrate in an intergranular phase of the matrix and should be minimized. The modifier comprises from about 2 to about 25 volume percent of the matrix, preferably from about 2 to about 10 volume percent. The matrix is defined as the modified silicon aluminum oxynitride.

In accordance with this invention, the refractory material comprises from about 5 to about 60 volume percent of the densified composite cutting tool, preferably from about 20 to about 40 volume percent. Typical hard refractory materials are the metal carbides, and/or nitrides, and/or carbonitrides and/or solid solutions thereof. Preferred hard refractory materials are the carbides, nitrides, carbonitrides and solid solutions thereof of metals selected from the group consisting of Ti, W, Hf, Nb, Ta, V, and combinations thereof. Particularly preferred hard refractory materials are TiC, TiN, HfC, HfN, Ti(C,N) and Hf(C,N).

The average particle size of the hard refractory material, determined by surface area measurement techniques (i.e. B.E.T.), ranges from about 0.5 microns to about 20 microns for cutting tool applications, preferably from about 0.5 microns to about 5 microns.

Figure 1:
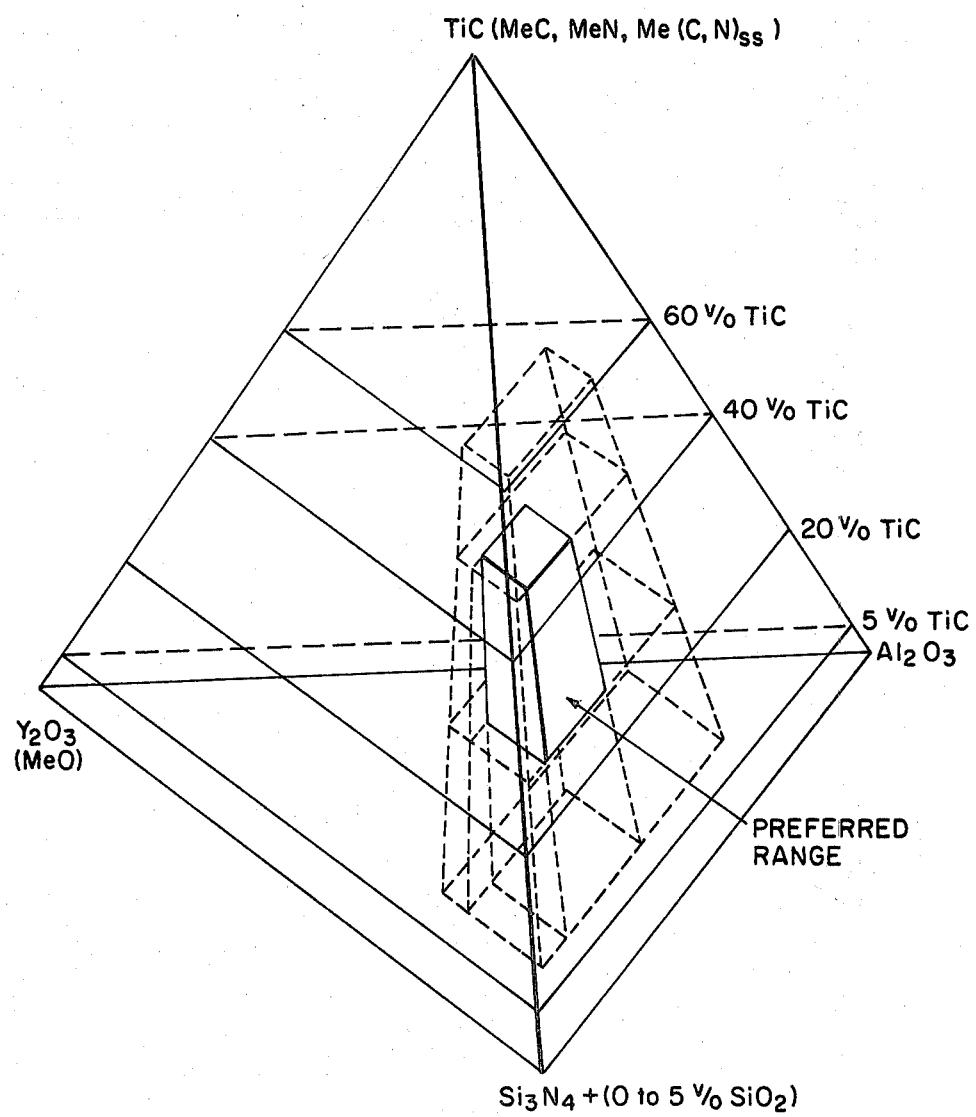
FIG. 1 illustrates the range of compositions of cutting tools in accordance with the present invention in a four component diagram.
Figure 2:
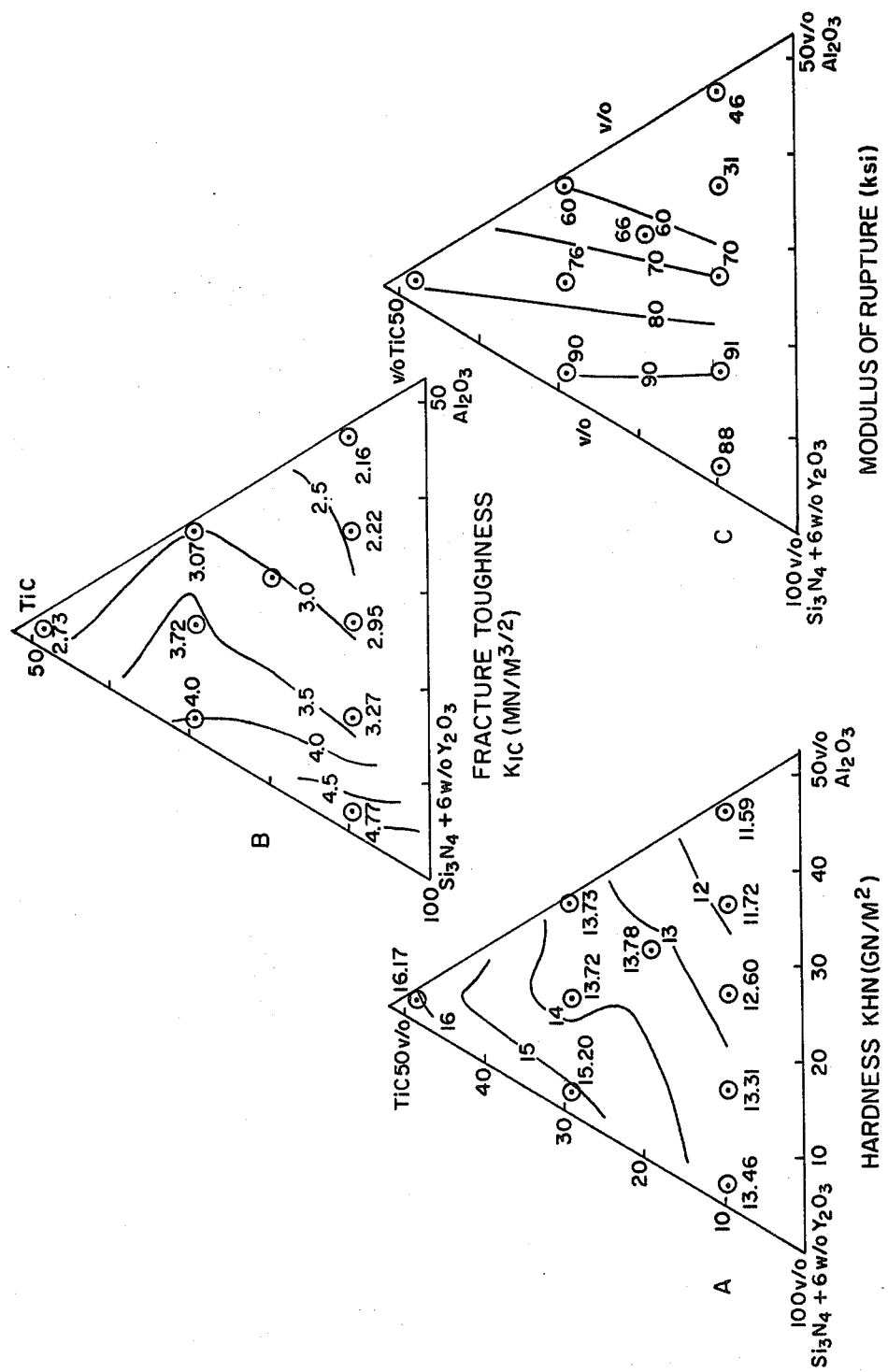
FIGS. 2a–2c illustrate variation in tool hardness (2a), fracture toughness (2b), and modulus of rupture (2c) with varying alumina content and refractory carbide content of articles in accordance with this invention.
Figure 4:
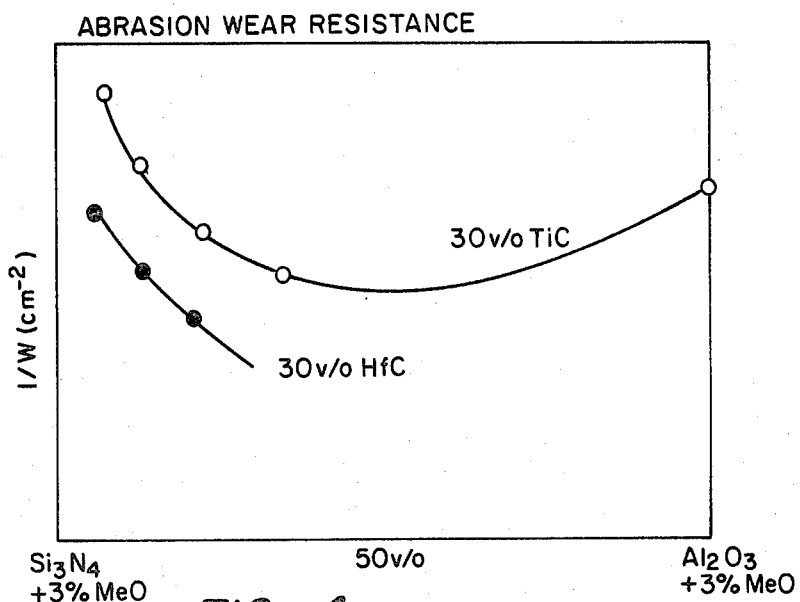
FIG. 4 is a graph illustrating abrasion resistance of cutting tools of the present invention compared with alumina-free and silicon nitride-free tools.
Figure 5:
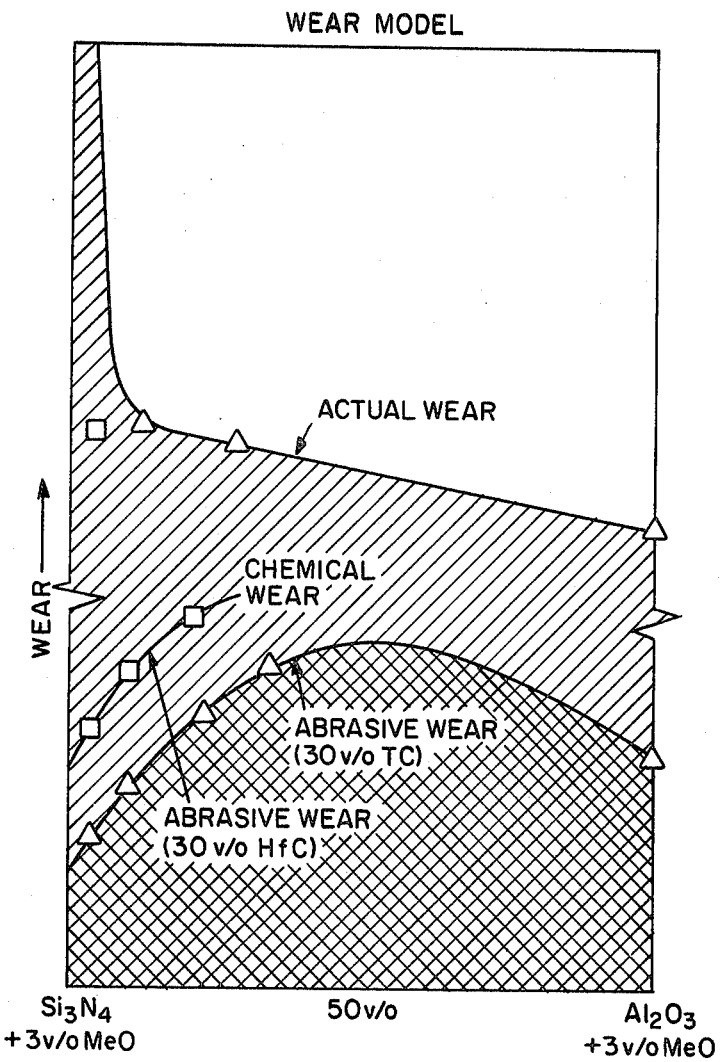
FIG. 5 illustrates a wear model of the abrasion and chemical wear components of tools in accordance with the present invention.

As shown in FIG. 2, the hardness of the cutting tools of this invention increases with increasing hard refractory material content. In order to optimize hardness together with fracture toughness, the preferred range of hard refractory material content is from about 20 to about 40 volume percent of the composite, with the most preferred range being about 30 volume percent; FIG. 4 shows 30 volume percent titanium and 30 volume percent hafnium carbide in various matrix compositions. The resistance to chemical wear of these tools increases with increasing aluminum oxide content, as shown in FIG. 5.

Figure 3:
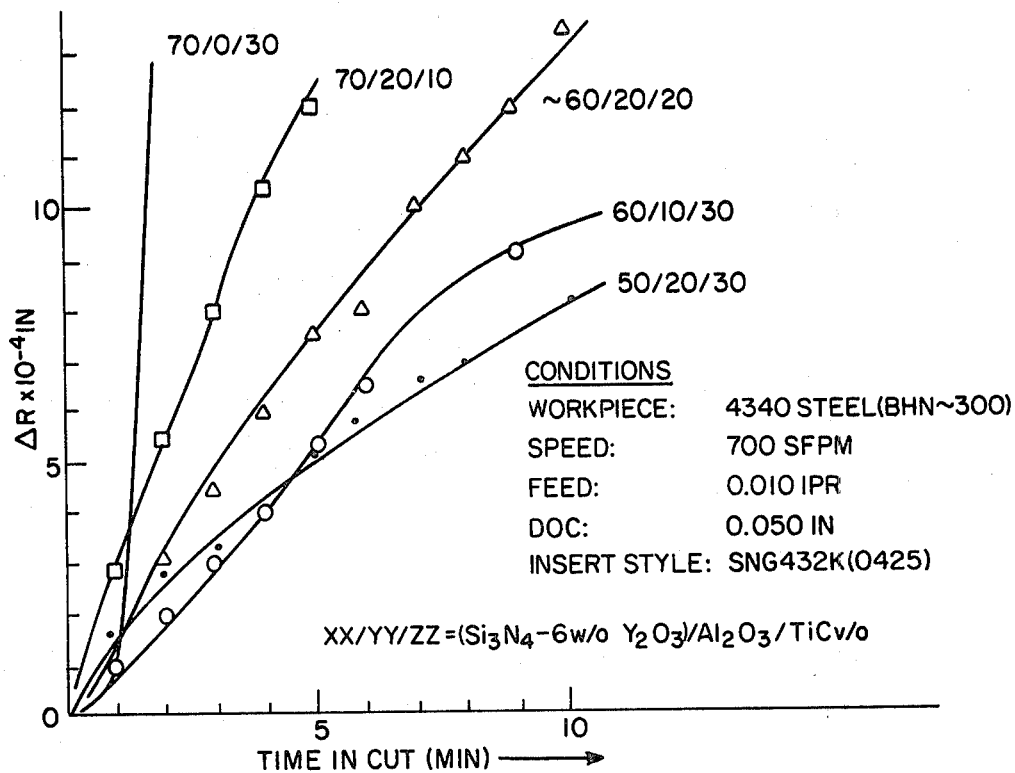
FIG. 3 illustrates improved wear resistance of the cutting tools fabricated in accordance with this invention over that of alumina-free tools.

The cutting tools of this invention are made by compacting the above-mentioned components to a highly dense article by conventional techniques such as sintering, hot pressing, or hot isostatic pressing. Since the strength of the resulting cutting tools decreases with increasing porosity of the compact, it is important that the compact be densified to a density as closely approaching theoretical density as possible. The examples shown in FIG. 2 have been consolidated to essentially full density. Improved wear resistance of cutting tools in accordance with this invention is illustrated in FIG. 3.

It has been found that mechanical mixing of the powdered components of the cutting tools of this invention results in smaller or larger inhomogeneities in the distribution of the modifying phase. These inhomogeneities may be of the order of 5 to 300 microns in size, resulting in undesired localized variation in properties of the matrix.

Homogeneity of the cutting tool material is an extremely important factor for tool performance. During cutting, only a small portion of the cutting tool is exposed to high stress and elevated temperatures. The temperature induced changes in mechanical properties, which are also compositionally dependent, contribute to fracture and chipping at the tool edge, in turn contributing to the rate of tool wear.

Modified silicon aluminum oxynitride based composite cutting tools of improved performance in accordance with this invention are obtained by pre-reacting a mixture of $Si_3N_4$, the metal oxide modifier, and from about 5 to 60 volume percent $Al_2O_3$ in a non-oxidizing atmosphere such as nitrogen, helium, or argon, at a temperature ranging from about 1400° C. to about 1800° C., preferably from about 1600° C. to about 1800° C. for a period of from about 1 hour to about 8 hours. The pre-reacted material is mixed with from about 5 to 50 volume percent of a hard refractory material selected from the carbides, nitrides, carbonitrides, and mixtures thereof of the refractory metals. The resulting mixture is comminuted by ball milling, high energy air milling, or attrition ball milling to form the initial composite blend. The composite blend is then densified to a density of at least 98% of theoretical by pressing followed by sintering, hot-pressing, gas over-pressure sintering, or hot isostatic pressing in a non-oxidizing atmosphere. Temperatures employed for pressing followed by sintering range from about 1600° C. to about 1800° C., preferably from about 1700° C. to about 1800° C. Hot-pressing is carried out at pressures greater than about 2000 psig (13,790 $kN/M^2$) at temperatures ranging from about 1600° C. to about 1900° C., preferably from about 1700° C. to about 1900° C. Gas over-pressure sintering is carried out at pressures from about 150 to about 200 psig (about 1030 to about 1380 $kN/M^2$) and at temperatures ranging from about 1600° C. to about 1950° C., preferably from about 1700° C. to about 1950° C. Hot isostatic pressing is carried out at pressures ranging above 10,000 psig (68,947 $kN/M^2$) and at temperatures ranging from 1600° C. to about 1900° C., preferably from about 1700° C. to about 1800° C.

The above-defined process steps improve the performance of the cutting tool because the process insures improved homogeneity of the matrix phase and uniform distribution of the hard refractory material throughout the cutting tool.

In order to fully utilize the advantages of the distributed hard refractory phase and to obtain a composite cutting tool with optimized chemical and mechanical wear resistance properties, it is preferred that the average particle size of the hard refractory material range between about 0.5 microns and about 20 microns in size, preferably between about 0.5 microns to about 5 microns.

Properties of the particulate composite cutting tool of this invvention are tailored for particular applications through structural modification of the composite by control of the particle size, distribution, and concentration of the hard refractory particulate. It has been observed, for example, that the presence of coarse particles having a size greater than about 20 microns greatly increases the probability of tool chipping and catastrophic tool failure during machining. Large particles of the hard refractory material were always noted at the point of fracture origin in photomicrographs of fracture surfaces. It was also noted that room temperature and elevated temperature strengths decrease with increasing particle size of the hard refractory, although there was an improvement in fracture toughness.

Finer dispersion of the hard refractory material in the composite also improves chemical homogeneity of the cutting tool. In machining applications where chemical interaction takes place predominantly between the matrix and the workpiece material, improved chemical homogeneity of the composite decreases wear while insuring that any wear of the cutting tool is uniform.

To tailor the chemical composition of the composite tool of this invention for specific applications, the dispersed phase may be varied for certain machining conditions. Titanium carbide, hafnium carbide, titanium nitride, hafnium nitride, titanium carbonitride, and hanfium carbonitride are preferred hard refractory materials for inclusion in composite cutting tools of this invention. In those applications where it is important to minimize chemical wear, titanium nitride is preferred to titanium carbide. Additionally, titanium nitride exhibits better resistance to oxidation than titanium carbide in composite cutting tools of the invention. Combinations of titanium carbide and titanium nitride or titanium carbonitride itself have been found to be preferable under certain machining conditions to optimize mechanical and overall machining properties.

The following examples are provided to enable one skilled in the art to practice the invention. These examples, however are to be viewed merely as illustrative of the present invention and should not be viewed as limiting the scope of the invention as defined by the appended claims.

EXAMPLE 1

To 41.7 weight percent silicon nitride powder were added 32.85 weight percent alumina powder, 4.02 weight percent yttria powder, and 21.43 weight percent titanium carbide powder. About 2.5 parts by weight toluene, 0.1 parts by weight methanol, and 0.05 parts by weight stearic acid were added to the powder mixture. The resulting slurry was thoroughy mixed by ball milling and then dried at 75° C. The dry mixture was then ball milled for about 24 hours. The resulting mixture was mixed with about 0.05 parts by weight of a copolymer of ethylene glycol and methoxyethylene glycol, 1 part by weight toluene, and about 0.05 parts by weight methanol. This mixture was mixed by ball milling for about 15 minutes after which the slurry was dried at 75° C. and screened through a 60 mesh screen. The −60 mesh fraction was pressed at about 25,000 psig (172,370 kN/M$^2$) to obtain a green compact. The green compact was then sintered to a hard, densified product by heating to a temperature of 1750° C. in argon for 1.5 hours.

EXAMPLE 2

The method of Example 2 was employed to produce a composite cutting tool substrate body by employing 23.60 weight percent titanium nitride as the hard refractory material in place of the titanium carbide of Example 2.

EXAMPLE 3

The method of Example 2 was employed to produce a composite cutting tool substrate body by employing 55.07 weight percent hafnium carbide as the hard refractory material in place of the titanium carbide of Example 2.

EXAMPLE 4

To 41.7 weight percent silicon nitride and about 32.85 weight percent alumina powder were added about 4.02 weight percent yttrium oxide powder. The resulting mixture was thoroughly mixed by ball milling and then prereacted by heating at about 1725° C. for a period of about 5 hours in a nitrogen atmosphere to produce prereacted modified silicon aluminum oxynitride. To 0.70 parts by volume of the preferred powder mixture were added about 0.30 parts by volume of titanium carbide powder. To the resulting powder mixture were added about 2.5 parts by weight toluene, about 0.1 parts by weight methanol, and about 0.05 parts by weight stearic acid. The resulting slurry was thoroughly mixed by ball milling and then dried at 75° C. The resulting dry mixture was ball milled for about 24 hours to uniformly distribute the titanium carbide throughout the prereacted modified silicon aluminum oxynitride. The resulting blend was mixed with about 0.05 parts by weight of a copolymer of ethylene glycol and methoxyethylene glycol, about 1 part by weight of toluene, and about 0.05 parts by weight of methanol. The resulting slurry was mixed by ball milling for about 30 minutes, dried at 75° C., and then screened through a 60 mesh screen. The −60 mesh fraction was pressed at about 25,000 psig (172,370 kN/M$^2$) to obtain a green compact which was thereafter sintered to a hard, highly densified body by heating at 1750° C. in argon.

EXAMPLE 5

A hard, highly densified cutting tool substrate body was produced by the general method outlined in Example 4; however densification of the −60 mesh powder mixture was effected by pressing the powder at a pressure of about 3000 psig (20,680 kN/M$^2$) at a temperature of about 1700° C. in argon.

EXAMPLE 6

The method of Example 4 was employed to produce a composite cutting tool substrate body by employing titanium nitride in place of the titanium carbide of Example 4 and by carrying out the sintering step in nitrogen at a temperature of about 1750° C.

While there have been shown and described what are at present considered to be the preferred embodiments of the present invention, it will be obvious to those skilled in the art that various changes and modifications may be made therein without departing from the scope of the invention as defined by the appended claims.

What is claimed is:

1. An abrasion resistant composite cutting tool consisting essentially of a particulate material selected from the group consisting of the refractory metal carbides, nitrides, carbonitrides and mixtures thereof of titanium, tungsten, hafnium, niobium, tantalum, vanadium, and combinations thereof uniformly distributed in a matrix comprising a modified silicon aluminum oxynitride, said particulate material comprising from about 5 volume percent to about 60 volume percent of said cutting tool and having an average particle size of between about 0.5 microns and about 20 microns; said modified silicon aluminum oxynitride having a modifier selected from the group consisting of the oxides of silicon, yttrium, magnesium, hafnium, zirconium, beryllium, the lanthanides and combinations thereof, said modified silicon aluminum oxynitride being formed from about 2 to about 25 volume percent of said modifier, from about 20 to about 90 volume percent silicon nitride, and from about 5 to about 60 volume percent aluminum oxide.

2. An abrasion resistant composite cutting tool in accordance with claim 1 wherein the average particle size of said particulate material ranges between about 0.5 microns and 5 microns.

3. An abrasion resistant composite cutting tool in accordance with claim 1 wherein said particulate material comprises from about 20 to about 40 volume percent of said cutting tool.

4. An abrasion resistant composite cutting tool in accordance with claim 1 wherein said modifier comprises from about 2 to about 10 volume percent of said modified silicon aluminum oxynitride.

5. An abrasion resistant composite cutting tool in accordance with claim 1 wherein said particulate material is selected from the group consisting of the carbides of titanium, tungsten, hafnium, niobium, tantalum, vanadium, and combinations thereof.

6. An abrasion resistant composite cutting tool in accordance with claim 1 wherein said particulate material is selected from the group consisting of titanium nitride and hafnium nitride.

7. An abrasion resistant composite cutting tool in accordance with claim 1 wherein said particulate material is selected from the group consisting of titanium carbonitride, hafnium carbonitride, and combinations thereof.

8. An abrasion resistant composite cutting tool in accordance with claim 5 wherein said particulate material is titanium carbide.

9. An abrasion resistant composite cutting tool in accordance with claim 1 wherein said modifier is yttrium oxide.

* * * * *